United States Patent
Shimura et al.

(10) Patent No.: US 10,982,009 B2
(45) Date of Patent: Apr. 20, 2021

(54) CELLULOSE DERIVATIVE AND USE THEREOF

(71) Applicant: NEC CORPORATION, Tokyo (JP)

(72) Inventors: Midori Shimura, Tokyo (JP); Shukichi Tanaka, Tokyo (JP); Kiyohiko Toyama, Tokyo (JP); Masatoshi Iji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 122 days.

(21) Appl. No.: 15/766,116

(22) PCT Filed: Aug. 29, 2016

(86) PCT No.: PCT/JP2016/075137
§ 371 (c)(1),
(2) Date: Apr. 5, 2018

(87) PCT Pub. No.: WO2017/061190
PCT Pub. Date: Apr. 13, 2017

(65) Prior Publication Data
US 2018/0291117 A1    Oct. 11, 2018

(30) Foreign Application Priority Data
Oct. 9, 2015 (JP) .............................. JP2015-200886

(51) Int. Cl.
*C08B 1/00* (2006.01)
*C08B 3/16* (2006.01)
*C08L 1/14* (2006.01)
*C08B 1/02* (2006.01)
*C08L 1/10* (2006.01)

(52) U.S. Cl.
CPC ................ *C08B 1/003* (2013.01); *C08B 1/02* (2013.01); *C08B 3/16* (2013.01); *C08L 1/10* (2013.01); *C08L 1/14* (2013.01); *C08L 2203/30* (2013.01)

(58) Field of Classification Search
CPC .................................... C08B 3/16; C08L 1/14
See application file for complete search history.

(56) References Cited

U.S. PATENT DOCUMENTS

2009/0161214 A1* 6/2009 Nakai .................. B29C 43/222
                                                        359/489.2
2015/0203723 A1* 7/2015 Combs ...................... C08B 5/04
                                                        428/355 CP

FOREIGN PATENT DOCUMENTS

| | | |
|---|---|---|
| JP | 2002-265639 A | 9/2002 |
| JP | 2005-219444 A | 8/2005 |
| JP | 2006-028346 A | 2/2006 |
| JP | 2006-052329 A | 2/2006 |
| JP | 2006-052330 A | 2/2006 |
| JP | 2006-169304 A | 6/2006 |
| JP | 2006-205708 A | 8/2006 |
| JP | 2006-341393 A | 12/2006 |
| JP | 2007-001286 A | 1/2007 |
| JP | 2007-030351 A | 2/2007 |
| JP | 2007-056118 A | 3/2007 |
| JP | 2007-056144 A | 3/2007 |
| JP | 2007-090753 A | 4/2007 |
| JP | 2007-137028 A | 6/2007 |
| JP | 2007-169588 A | 7/2007 |
| JP | 2007-169594 A | 7/2007 |
| JP | 2008-007746 A | 1/2008 |
| JP | 2008-050562 A | 3/2008 |
| JP | 2008-056890 A | 3/2008 |
| JP | 2008-095027 A | 4/2008 |
| JP | 2010-121121 A | 6/2010 |
| WO | 2006/132367 A1 | 12/2006 |
| WO | 2010/047351 A1 | 4/2010 |
| WO | 2013/180278 A1 | 12/2013 |
| WO | 2015/025761 A1 | 2/2015 |
| WO | 2015/060122 A1 | 4/2015 |

OTHER PUBLICATIONS

Nozoe (WO 2010/047351 A1), Machine Translated Copy. (Year: 2010).*
Fujifilm Research & Development No. 57-2012.
International Search Report of PCT/JP2016/075137 dated Sep. 20, 2016 [PCT/ISA/210].
Japanese Decision to Grant for JP Application No. 2017-544412 dated Dec. 1, 2020 with English Translation.

* cited by examiner

*Primary Examiner* — Shaojia A Jiang
*Assistant Examiner* — Everett White
(74) *Attorney, Agent, or Firm* — Sughrue Mion, PLLC

(57) ABSTRACT

To provide a cellulose derivative excellent in thermoplasticity, water resistance and strength (elastic modulus, impact strength), a cellulose derivative, which is obtained by introducing a short-chain organic group (acetyl group), a medium-chain organic group having 3 to 5 carbon atoms and a long-chain organic group having 6 to 30 carbon atoms at the following substitution degrees DSs into a cellulose, is used: Short-chain organic group: $0.7 \leq DS_{SH} \leq 1.5$; Medium-chain organic group: $0.5 \leq DS_{ME} \leq 2.0$; Long-chain organic group: $0.1 \leq DS_{LO} < 0.5$; and $2.4 \leq DS_{SH} + DS_{ME} + DS_{LO} \leq 3$.

15 Claims, No Drawings

CELLULOSE DERIVATIVE AND USE THEREOF

CROSS REFERENCE TO RELATED APPLICATIONS

This application is a National Stage of International Application No. PCT/JP2016/075137, filed Aug. 29, 2016, claiming priority based on Japanese Patent Application No. 2015-200886, filed Oct. 9, 2015, the contents of all of which are incorporated herein by reference in their entirety.

TECHNICAL FIELD

The present invention relates to a cellulose derivative, a resin composition including the cellulose derivative and a molding obtained by molding the cellulose derivative. The present invention also relates to a method for producing the cellulose derivative.

BACKGROUND ART

Bioplastic using a plant as a raw material can contribute to a countermeasure against petroleum depletion and global warming and has been started being used not only in common products such as packaging, containers and fibers but also in durable products such as electronics and automobiles.

However, typical bioplastics, such as polylactic acid, polyhydroxyalkanoate and modified starch, all use starch materials, more precisely, edible parts, as raw materials. Accordingly, for fear of future food shortage, it has been desired to develop a novel bioplastic using a non-edible part as a raw material.

As a raw material of a non-edible part, cellulose which is a main component of wood and plant is representative, and various types of bioplastics using the cellulose have been already developed and commercialized. However, since durability (such as strength, heat resistance, and water resistance) of a commercialized cellulose resin is not sufficient, use of the resin is limited.

As a cellulose, pulp is known, which is obtained by chemically separating lignin and hemicellulose from wood, etc., with the help of a chemical agent. In contrast, cotton can be used as it is since it is virtually formed of cellulose. Such a cellulose is a high molecular weight compound obtained by polymerization of β-glucose; however, the cellulose has strong intermolecular force based on hydrogen bonds since it has a large number of hydroxyl groups. Because of this, cellulose is hard and fragile, and has no thermoplasticity and a low solubility in a solvent except a special solvent. In addition, due to a large number of hydrophilic hydroxyl groups, water absorbability is high and water resistance is low.

For improving such qualities of a cellulose, various investigations have been made.

As a method for improving the quality of a cellulose, a method of substituting a hydrogen atom of a hydroxyl group in a cellulose with a short-chain organic group such as an acetyl group is known. According to this method, since the number of hydroxyl groups can be reduced, the intermolecular force of a cellulose can be reduced. However, use of a short-chain organic group such as an acetyl group alone is not enough to obtain sufficient thermoplasticity and water resistance. If a long-chain organic group having a larger number of carbon atoms is introduced into a cellulose in addition to a short-chain organic group, the long-chain organic group serves as a hydrophobic internal plasticizer to improve thermoplasticity and water resistance.

For example, in Patent Literature 1, a cellulose derivative is synthesized by substituting at least a part of hydrogen atoms of hydroxyl groups of a cellulose with an aliphatic acyl group having 2 to 4 carbon atoms and an aliphatic acyl group having 5 to 20 carbon atoms. It is stated that the cellulose derivative has not only thermoplasticity and water resistance but also satisfactory impact resistance and rupture elongation and is thus suitable for molding process.

Patent Literature 2 discloses a cellulose having mixed fatty acid esters, which is obtained by substituting hydroxyl groups of a cellulose with an acetyl group and an acyl group having 3 or more carbon atoms; and mentions that a film formed of such a cellulose derivative has excellent physical properties and produced by a solvent casting method.

Non Patent Literature 1 states that a material having thermoplasticity and well balanced rigidity/impact resistance/heat resistance can be provided by using an acetyl group in combination with 2-ethylhexanoyl group.

CITATION LIST

Patent Literature

Patent Literature 1: JP2010-121121A
Patent Literature 2: JP2002-265639A

Non Patent Literature

Non Patent Literature 1: FUJIFILM RESEARCH & DEVELOPMENT No. 57-2012

SUMMARY OF INVENTION

Technical Problem

In the method for improving the quality of a cellulose by introducing not only a short-chain organic group such as an acetyl group but also a long-chain organic group having a larger number of carbon atoms, if the substitution degree with the long-chain organic group is increased in order to impart satisfactory thermoplasticity, elastic modulus of the resultant cellulose derivative tends to decrease by influences of high flexibility and steric hindrance of the long-chain organic group. In order to impart satisfactory thermoplasticity to a cellulose while maintaining high elastic modulus, it is considered good to introduce a long-chain organic group equally into a cellulose chain at as low a substitution degree as possible. However, since a long-chain organic group has large steric hindrance and low polarity, the reactivity of the long-chain organic group with a hydroxyl group of a cellulose is extremely low compared to a short-chain organic group. Accordingly, when a short-chain organic group and a long-chain organic group are introduced in a cellulose, a hydroxyl group of the cellulose preferentially reacts with the short-chain organic group, with the result that the short-chain organic group and long-chain organic group are unevenly localized in the cellulose. Consequently, in order to impart satisfactory thermoplasticity, too much long-chain substituents than necessary have to be introduced. For the reason, it was difficult to obtain satisfactory thermoplasticity and high elastic modulus, at the same time.

The cellulose resin according to Patent Literature 1 is excellent in impact resistance, water resistance and rupture elongation; however, the cellulose resin needs to be improved in properties when it is applied to, for example, uses requiring high elastic modulus. The cellulose resin according to Patent Literature 2 has high equilibrium moisture content and then it needs to be improved in properties when it is applied to, for example, uses requiring water resistance.

An object of the present invention is to provide a cellulose derivative excellent in thermoplasticity, water resistance and strength (elastic modulus, impact strength).

Solution to Problem

According to one aspect of the present invention, there is provided a cellulose derivative in which at least a part of hydrogen atoms of hydroxyl groups of a cellulose is substituted with a short-chain organic group (acetyl group) having 2 carbon atoms, a medium-chain organic group having 3 to 5 carbon atoms and a long-chain organic group having 6 to 30 carbon atoms at the following substitution degrees:

$0.7 \leq DS_{SH} \leq 1.5$
$0.5 \leq DS_{ME} \leq 2.0$
$0.1 \leq DS_{LO} < 0.5$
$2.4 \leq DS_{SH} + DS_{ME} + DS_{LO} \leq 3$ where $DS_{SH}$ represents the substitution degree with the short-chain organic group; $DS_{ME}$ represents the substitution degree with the medium-chain organic group; and $DS_{LO}$ represents the substitution degree with the long-chain organic group.

Advantageous Effects of Invention

According to one aspect of the present invention, it is possible to provide a cellulose derivative excellent in thermoplasticity, water resistance and strength (elastic modulus, impact strength).

DESCRIPTION OF EMBODIMENTS

According to one aspect of the present invention, a cellulose derivative characterized by exhibiting high elastic modulus and satisfactory thermoplasticity and being excellent in water resistance and impact resistance can be provided by using a short-chain organic group (acetyl group) and a long-chain organic group as well as a medium-chain organic group in combination; and a production method thereof can be provided. The medium-chain organic group has the number of carbon atoms between those of an acetyl group and a long-chain organic group and enhances affinity between a short-chain organic group and a long-chain organic group. Because of this, the individual organic groups are presumably evenly introduced into a cellulose. Such a cellulose derivative can be used in durable products such as electronics and automobiles.

Now, the present invention will be more specifically described with reference to example embodiments.

[Cellulose]

Cellulose is a straight-chain polymer of β-glucose represented by the following formula (1) and each of glucose units except the units positioned at the ends has three hydroxyl groups. These hydroxyl groups can be substituted with short-chain, medium-chain and long-chain organic groups.

Cellulose is a main component of plants and can be obtained by a separation treatment for removing other components such as lignin from a plant. Other than those thus obtained, cotton and pulp that have a high cellulose content can be used directly or after they are purified.

The polymerization degree of a cellulose in terms of polymerization degree of a glucose falls within the range of preferably 50 to 5,000 and more preferably 100 to 3,000. If the polymerization degree is extremely low, the strength and heat resistance of the produced resin may not be sufficient in some cases. Conversely, if the polymerization degree is extremely high, the melt viscosity of the produced resin is extremely high, interfering with molding in some cases.

Cellulose can be mixed with chitin or/and chitosan that have a structure analogous to cellulose. When chitin or/and chitosan are mixed in cellulose, the amount of chitin or/and chitosan is preferably 30 mass % or less relative to the total amount of mixture, preferably 20 mass % or less and further preferably 10 mass % or less.

[Cellulose Derivative]

According to an example embodiment, there is provided a cellulose derivative in which at least a part of hydrogen atoms of hydroxyl groups of the above cellulose is substituted with a short-chain organic group (acetyl group) having 2 carbon atoms, a medium-chain organic group having 3 to 5 carbon atoms and a long-chain organic group having 6 to 30 carbon atoms at the following substitution degrees:

$0.7 \leq DS_{SH} \leq 1.5$
$0.5 \leq DS_{ME} \leq 2.0$
$0.1 \leq DS_{LO} < 0.5$
$2.4 \leq DS_{SH} + DS_{ME} + DS_{LO} \leq 3$ where $DS_{SH}$ represents the substitution degree with the short-chain organic group; $DS_{ME}$ represents the substitution degree with the medium-chain organic group; and $DS_{LO}$ represents the substitution degree with the long-chain organic group.

[Short-Chain Organic Group]

The short-chain organic group is an acetyl group. The short-chain organic group can be introduced by reacting a hydroxyl group of a cellulose with a short-chain reactant such as acetic acid, acetic anhydride or acetyl chloride.

The number of hydroxyl groups substituted with a short-chain organic group per glucose unit of a cellulose (the substitution degree of the hydroxyl group)(average value), in other words, substitution degree ($DS_{SH}$)(average value), is 0.7 or more, preferably 0.9 or more and more preferably 0.95 or more in view of enhancing interaction of cellulose molecular chains and imparting a high elastic modulus. In contrast, to sufficiently obtain substitution degrees ($DS_{ME}$, $DS_{LO}$) with a medium-chain organic group and a long-chain organic group, $DS_{SH}$ is 1.5 or less and preferably 1.3 or less.

[Formula 1]

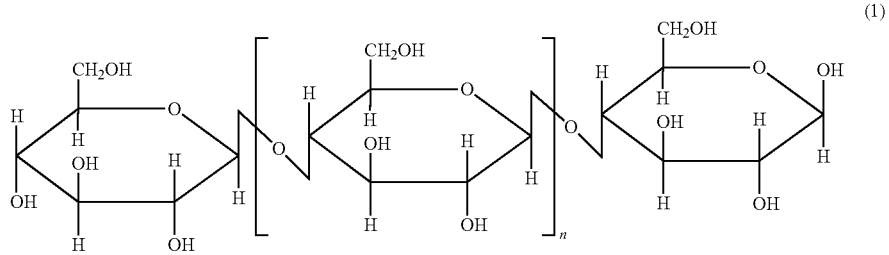

(1)

Note that, the substitution degree DS of a cellulose derivative can be obtained by measuring the cellulose derivative dissolved in deuterated chloroform ($CDCl_3$) by ¹H-NMR. If a cellulose derivative is insoluble in CDCl₃, the remaining hydroxyl groups of the cellulose derivative are further acetylated or propionylated and then DS can be measured.

[Medium-Chain Organic Group]

The medium-chain organic group is a linking group formed by reacting a medium-chain reactant with a hydroxyl group of a cellulose. The medium-chain reactant is a compound having at least one functional group capable of reacting with a hydroxyl group of a cellulose. Examples of the medium-chain reactant include a hydrocarbon compound having a carboxyl group, a carboxylic acid halide group or a carboxylic acid anhydride group, an isocyanate group, a chloroformate group or an acrylic group. Specific examples thereof include an aliphatic monocarboxylic acid, an acid halide or acid anhydride thereof, an aliphatic monoisocyanate, an aliphatic monochloroformate, an acrylic acid ester and a methacrylic acid ester.

The medium-chain organic group has 3 to 5 carbon atoms, preferably 3 or 4 carbon atoms and more preferably 3 carbon atoms. The medium-chain reactants for introducing such a medium-chain organic group are as follows: As the aliphatic monocarboxylic acid, propionic acid, isopropionic acid, butanoic acid, isobutanoic acid, t-butanoic acid, pentanoic acid, isopentylic acid and aliphatic monocarboxylic acid having, e.g., a 2-methylbutyryl group or a 3-methylbutyryl group, are specifically mentioned; propionic acid, isopropionic acid, butanoic acid, isobutanoic acid and t-butanoic acid are preferable; and propionic acid is further preferable. Examples of the aliphatic monoisocyanate include an aliphatic monoisocyanate having an isocyanate group bound to an aliphatic hydrocarbon having a straight-chain or branched side chain. Examples of the aliphatic monochloroformate include an aliphatic monochloroformate having a chloroformate group bound to an aliphatic hydrocarbon having a straight-chain or branched side chain. As the medium-chain organic group, an acyl group having 3 or 4 carbon atoms is preferable and a propionyl group is particularly preferable.

The substitution degree ($DS_{ME}$)(average value) with a medium-chain organic group per glucose unit of a cellulose is 0.5 or more, preferably 0.7 or more and more preferably 1.0 or more, in view of obtaining an effect of enhancing affinity between a short-chain organic group and a long-chain organic group. From the view point of securing a sufficient substitution degree ($DS_{LO}$) with a long-chain organic group, $DS_{ME}$ is 2.0 or less and preferably 1.5 or less.

[Long-Chain Organic Group]

The long-chain organic group is a linking group formed by reacting a long-chain reactant with a hydroxyl group of cellulose. The long-chain reactant is a compound having at least one functional group capable of reacting with a hydroxyl group of cellulose. Examples of the long-chain reactant include a hydrocarbon compound having a carboxyl group, a carboxylic acid halide group or a carboxylic acid anhydride group, an isocyanate group, a chloroformate group or an acrylic group. Specific examples thereof includes at least one compound selected from an aliphatic monocarboxylic acid, an aromatic monocarboxylic acid and an alicyclic monocarboxylic acid; at least one compound selected from its acid halide or its acid anhydride, an aliphatic monoisocyanate, an aromatic monoisocyanate and an alicyclic monoisocyanate; at least one compound selected from an aliphatic monochloroformate, an aromatic monochloroformate and a alicyclic monochloroformate; an acrylic acid ester; and a methacrylic acid ester.

The long-chain organic group has 6 to 30 carbon atoms and preferably 9 to 30 carbon atoms; and more preferably 12 to 30 carbon atoms because a thermoplastic effect can be obtained in a small amount. Long-chain organic groups can be substituted singly or in combination of two or more kinds. As the aliphatic monocarboxylic acid serving as the long-chain reactant, a straight fatty acid or a fatty acid having a branched side chain is mentioned. As the fatty acid, a saturated fatty acid and an unsaturated fatty acid are mentioned. In view of thermal stability, a saturated fatty acid is preferable. Examples of the aromatic monocarboxylic acid include aromatic monocarboxylic acids in which a carboxyl group directly binds to an aromatic ring, and aromatic monocarboxylic acids in which a carboxyl group binds to an aromatic ring via an alkylene group (e.g., a methylene group or an ethylene group) (binding an aliphatic carboxylic acid group to an aromatic ring). Examples of the alicyclic monocarboxylic acid include alicyclic monocarboxylic acids in which a carboxyl group directly binds to an aliphatic ring, and alicyclic monocarboxylic acids in which a carboxyl group binds to an aliphatic ring via an alkylene group (e.g., a methylene group or ethylene group) (binding an aliphatic carboxylic acid group to an aliphatic ring). Examples of the aliphatic monoisocyanate include aliphatic monoisocyanates in which an isocyanate group binds to a straight aliphatic hydrocarbon or an aliphatic hydrocarbon having a branched side chain. Examples of the aromatic monoisocyanate include aromatic monoisocyanates in which an isocyanate group directly bonds to an aromatic ring, and aromatic monoisocyanates in which an isocyanate group binds to an aromatic ring via an alkylene group (e.g., a methylene group or an ethylene group) (binding an aliphatic isocyanate group to an aromatic ring). Examples of the alicyclic monoisocyanate include alicyclic monoisocyanates in which an isocyanate group directly binds to an aliphatic ring, and alicyclic monoisocyanates in which an isocyanate group binds to an aliphatic ring via an alkylene group (e.g., a methylene group or an ethylene group) (binding an aliphatic isocyanate group to an aliphatic ring). Examples of the aliphatic monochloroformate include aliphatic monochloroformates in which a chloroformate group to a straight aliphatic hydrocarbon or an aliphatic hydrocarbon having a branched side chain. Examples of the aromatic monochloroformate include aromatic monochloroformates in which a chloroformate group directly binds to an aromatic ring, and aromatic monochloroformates in which a chloroformate group binds to an aromatic ring via an alkylene group (e.g., a methylene group or an ethylene group) (binding an aliphatic chloroformate group to an aromatic ring). Examples of the alicyclic monochloroformate include alicyclic monochloroformates in which a chloroformate group directly binds to an aliphatic ring, and alicyclic monochloroformates in which a chloroformate group binds to an aliphatic ring via an alkylene group (e.g., a methylene group or an ethylene group) (binding an aliphatic chloroformate group to an aliphatic ring). As the long-chain organic group, an acyl group having 12 to 30 carbon atoms is preferable and a stearyl group is particularly preferable.

The number of hydroxyl groups (the substitution degree of the hydroxyl group)(average value) substituted with a long-chain organic group per glucose unit of cellulose, in other words, substitution degree ($DS_{LO}$)(average value), is 0.1 or more and preferably 0.2 or more. If $DS_{LO}$ is extremely low, the effects of improving thermoplasticity and water resistance by a long-chain organic group are not sufficiently imparted in some cases. $DS_{LO}$ is less than 0.5, preferably 0.4 or less and more preferably 0.3 or less. If $DS_{LO}$ is extremely high, the elastic modulus of a cellulose derivative decreases.

DS values with short-chain, medium-chain and long-chain organic groups can be optimally set in accordance with the structures of organic groups and physical properties required for a cellulose derivative.

[Remaining Amount of Hydroxyl Groups in a Cellulose Derivative]

As the amount of hydroxyl group increases, maximum strength and heat resistance of the cellulose derivative tend to increase; whereas water absorbability tends to increase. In contrast, as the conversion rate (degree of substitution) of hydroxyl groups increases, water absorbability tends to decrease, plasticity and rupture strain tend to increase; whereas, maximum strength and heat resistance tend to decrease. In consideration of these tendencies and the reaction conditions of short-chain, medium-chain and long-chain organic groups, the conversion rate of hydroxyl groups can be appropriately set.

From the view point of securing sufficient water resistance, the number of remaining hydroxyl groups (hydroxyl group remaining degree, $DS_{OH}$)(average value) per glucose unit of a cellulose derivative is preferably 0.6 or less, more preferably 0.5 or less and further preferably 0.4 or less.

Since the number of hydroxyl groups per glucose unit of a cellulose derivative is three, the sum of a short chain, medium chain and a long chain: $DS_{SH}+DS_{ME}+DS_{LO}$, is $$2.4 < DS_{SH}+DS_{ME}+DS_{LO} \le 3.$$

The substitution degrees with individual organic groups are summarized as follows:

| | |
|---|---|
| Short-chain organic group | $0.7 \le DS_{SH} \le 1.5$ |
| Medium-chain organic group | $0.5 \le DS_{ME} \le 2.0$ |
| Long-chain organic group | $0.1 \le DS_{LO} < 0.5$ |
| $2.4 < DS_{SH} + DS_{ME} + DS_{LO} \le 3$ | |

[Molecular Weight of a Cellulose Derivative]

The number average molecular weight (Mn) of a cellulose derivative according to the example embodiment is, for example, preferably 10,000 or more and more preferably 20,000 or more, and also preferably 200,000 or less and more preferably 100,000 or less. The weight average molecular weight (Mw) is, for example, preferably 10,000 or more and more preferably 20,000 or more, and also preferably 200,000 or less and more preferably 100,000 or less. The molecular weight distribution (Mw/Mn) is, for example, preferably 1.1 or more and more preferably 1.4 or more, and also preferably 4.0 or less and more preferably 3.5 or less. If the number average molecular weight, weight average molecular weight and molecular weight distribution fall within the aforementioned ranges, properties such as strength, thermoplasticity and moldability are improved. The molecular weight can be measured by gel permeation chromatography (GPC) using, for example, chloroform as a solvent (calibrated based on a polystyrene standard sample). A cellulose derivative insoluble in chloroform can be measured after the remaining hydroxyl group of a cellulose derivative is further acetylated or propionylated.

Now, the production method according to the example embodiment will be more specifically described.

[Activation of Cellulose]

Before the reaction step for introducing the individual organic group into cellulose, an activation treatment (pretreatment step) can be performed in order to increase the reactivity of the cellulose.

In the activation treatment, cellulose is swollen by bringing the cellulose into contact with an activation solvent having affinity for the cellulose, for example, by a method of spraying the activation solvent to cellulose or by a method (soaking method) of soaking cellulose in the activation solvent. Owing to the treatment, a reactant easily enters between cellulose molecular chains (if a solvent or a catalyst is used, a reactant easily enters together with these), with the result that the reactivity of the cellulose improves. Herein, examples of the activation solvent include water; carboxylic acids such as acetic acid, propionic acid, butyric acid, valeric acid, caproic acid, enanthic acid, caprylic acid and pelargonic acid; alcohols such as methanol, ethanol, propanol and isopropanol; nitrogen-containing compounds such as N,N-dimethylformamide, N,N-dimethylacetamide, formamide, ethanolamine, pyridine and N-methylpyrrolidone; and sulfoxide compounds such as dimethylsulfoxide. These solvent can be used in combination of two or more. Particularly preferably, water, acetic acid, propionic acid, dimethylformamide, dimethylacetamide, pyridine, N-methylpyrrolidone and dimethylsulfoxide can be used. Note that, if an activation solvent contains a carboxylic acid, an acyl group having the corresponding number of carbon atoms is sometimes introduced. In this case, a treatment with short-chain, medium-chain and/or long-chain reactants having the corresponding number of carbon atoms is no longer required in a later step, in some cases. Particularly, it is preferable that cellulose is swollen with water, dewatered, and then treated with acetic acid to convert a part of hydroxyl groups of the cellulose into acetyl groups.

The use amount of the activation solvent relative to 100 parts by mass of cellulose can be set to be, for instance, 10 parts by mass or more, preferably 20 parts by mass or more and more preferably 30 parts by mass or more. If cellulose is soaked in an activation solvent, the use amount of activation solvent relative to the cellulose in term of mass, can be set to be, for example, the same or more, preferably 5 times or more and more preferably 10 times or more. In view of load for removing an activation solvent after the pretreatment and cost reduction of materials, the use amount of activation solvent is preferably 300 times or less, more preferably 100 times or less and further preferably 50 times or less.

The temperature of the activation treatment can be appropriately set within the range of, for example, 0 to 100° C. In view of the efficiency of activation and reduction of energy cost, the temperature is preferably 10 to 40° C. and more preferably 15 to 35° C.

The time for the activation treatment can be appropriately set within the range of, for example, 0.1 hour to 72 hours. In order to perform sufficient activation and reduce the treatment time, the time is preferably 0.1 hour to 24 hours and more preferably 0.5 hours to 3 hours.

After the activation treatment, an excessive activation solvent can be removed by a solid-liquid separation method such as suction filtration.

If a solvent is used in a reaction for introducing an organic group, the activation solvent contained in cellulose can be substituted with the solvent to be used in the reaction after the activation treatment. For example, a treatment for substituting a solvent can be performed by changing the activation solvent used in the soaking method of an activation treatment mentioned above to a solvent (reaction solvent) to be used in the reaction, and then, soaking the activated cellulose in the same manner.

[Introduction of Organic Group]

To cellulose or a cellulose subjected to the above activation treatment, each of organic groups is introduced. In this reaction step, a short-chain reactant, a medium-chain reactant, and a long-chain reactant as mentioned above, and, if necessary, a solvent and a catalyst are mixed with cellulose. Cellulose can be reacted with the short-chain reactant, medium-chain reactant and long-chain reactant in a solid-liquid heterogeneous system. At this time, if necessary, heating or stirring can be performed. The types of the reactive functional groups of the short-chain reactant, medium-chain reactant and long-chain reactant are preferably the same. Note that, if the above reactants are acid anhydrides, a mixed acid anhydride (asymmetric acid anhydride) of two of organic acids selected from a short-chain organic acid, a medium-chain organic acid and a long-chain organic acid can be used.

In this reaction step, cellulose can be reacted in a state of swelling by soaking the cellulose in a reaction solution containing the short-chain reactant, medium-chain reactant and long-chain reactant. Owing to this, the individual reactants can easily enter between cellulose molecular chains, so that the reactivity improves.

The use amount of reaction solvent relative to cellulose in terms of mass can be set to be, for example, the same or more, preferably five times or more, and more preferably 10 times or more. In view of load for removing a reaction solution after completion of a reaction and cost reduction of materials, the use amount of the reaction solvent is preferably 300 times or less, more preferably 100 times or less, further preferably 50 times or less and particularly preferably 30 times or less.

The reaction temperature is preferably 10° C. or more, more preferably 20° C. or more and further preferably 30° C. or more in view of reaction efficiency etc. In view of suppression of decomposition reaction and reduction in energy cost, the reaction temperature is preferably 200° C. or less, more preferably 150° C. or less and further preferably 100° C. or less.

The reaction time is preferably 0.5 hours or more and more preferably one hour or more from the viewpoint of sufficient progress of the reaction, and preferably 24 hours or less, more preferably 12 hours or less and further preferably 4 hours or less in view of efficiency of the production process.

If a reaction solvent is used, a solvent having high affinity for a product, i.e., a cellulose derivative, can be used. Such a solvent can be appropriately selected depending upon the amount of remaining hydroxyl groups in the cellulose derivative and the hydrophobicity and introduction amounts of organic groups and the types of functional groups of the organic reactants. As a reaction solvent, an aprotic solvent is preferable, and particularly, a proton-affinity solvent forming a hydrogen bond with a hydroxyl group of cellulose, is preferable.

Examples of such a high affinity solvent include a hetero cyclic compound, an ether, an amide, a ketone, an ester, a polar halogenated hydrocarbon, a carbonate, a nitro compound, a nitrile and an organosulfur compound. Examples of the hetero cyclic compound include cyclic ethers (such as dioxane, tetrahydrofuran, and dioxolane) and heteroarene (such as pyridine and quinoline). Examples of ether having high affinity include, other than the above cyclic ethers, non-cyclic ethers having a plurality of ether structures such as 1,2-dimethoxyethane and diethylene glycol dimethyl ether and ethers having an aryl group such as methylphenyl ether and diphenyl ether. Examples of the amide include N-methylpyrrolidone, N,N-dimethylformamide and N,N-dimethylacetamide. Examples of the ketone include acetone, methyl ethyl ketone, methyl isobutyl ketone and cyclohexanone. Examples of the ester include methyl formate, methyl acetate, ethyl acetate, butyl acetate and methyl cellosolve acetate. Examples of the polar halogenated hydrocarbon include chloroform, methylene chloride, dichloroethane, propylene chloride and tetrachloroethane. Examples of the carbonate include propylene carbonate and butylene carbonate. Examples of the nitro compound include nitromethane and nitropropane. Examples of the nitrile include acetonitrile and benzonitrile. Examples of the organosulfur compound include sulfoxide compounds such as dimethylsulfoxide. These solvents can be used as a mixture two or more. Owing to use of such a solvent as mentioned above, a satisfactory swollen state of the cellulose derivative is formed and the influence of steric hindrance is reduced and the reactivity of the reactant can be increased. In the course of a reaction, the same or different type of solvent may be appropriately added.

If a catalyst is used, the catalyst can be appropriately selected in accordance with the type of a short-chain reactant, a medium-chain reactant and a long-chain reactant and then put in use. For example, if the reactant is a carboxylic acid and a carboxylic acid anhydride, an acid catalyst, a base catalyst or a metal-based catalyst can be used. Examples of the acid catalyst include inorganic acids (such as sulfuric acid, perchloric acid, and hydrochloric acid) and organic acids (such as methane sulfonic acid and toluene sulfonic acid). Examples of the base catalyst include pyridine derivatives (such as dimethylaminopyridine (DMAP) and 4-pyrrolidinopyridine), imidazoles (such as 1-methylimidazole and 1,2-dimethylimidazole) and amidines (such as diazabicyclo undecene (DBU) and diazabicyclo nonene). In view of reactivity, sulfuric acid, perchloric acid, DMAP and DBU are preferable. Examples of the metal-based catalyst include chlorides of metal such as iron, aluminum, indium, zirconium, zinc, cobalt, nickel and copper (e.g., iron chloride, aluminum chloride, indium chloride, basic zirconium chloride, zinc chloride, cobalt chloride, nickel chloride, and copper chloride); nitrates of the above metals; sulfates of the above metals; and organic acid salts (e.g., acetic acid salts) of the above metals.

If a reactant includes an isocyanate group as a functional group, an organic metal catalyst and a base catalyst can be used. Examples of the organic metal catalyst include tin octylate and dibutyltin dilaurate. Examples of the base catalyst include triethylene diamine and trimethyl aminoethyl piperazine.

The use amounts of short-chain reactant, medium-chain reactant and long-chain reactant are, for example, 1.1 to 10 equivalents, preferably 1.3 to 5.0 equivalents relative to a hydroxyl group of cellulose. In consideration of reactivity of short-chain, medium-chain and long-chain organic reactants, the use amounts can be appropriately set. If an acid anhydride is used as a reactant, it is not necessary that short-chain, medium-chain and long-chain reactants are all acid anhydrides; a mixture of a carboxylic acid and an acid anhydride is also satisfactorily used; and a carboxylic acid in an activation solvent can be used in the reaction. For example, a carboxylic acid (for example, acetic acid) is used as an activation solvent in activating a cellulose, and allowed to remain in the cellulose. In this state, the cellulose is reacted with a mixed acid anhydride (for example, a medium-chain acid anhydride and a long-chain carboxylic acid). In this manner, a reaction proceeds through an esterification step and an aging step to introduce short-chain, medium-chain and long-chain organic groups into the cellulose.

If a sulfuric acid is used as a reaction catalyst, the sulfuric acid catalyst is removed by a known method. At this time, to improve thermal stability of a cellulose derivative and suppress hydrolysis thereof, a heat proof treatment can be performed by use of a known formulation. Particularly, a salt or compound of an alkaline earth metal (such as calcium, magnesium, strontium and barium) is preferably added within the range not affecting the physical properties of a cellulose to inactivate a sulfuric acid group.

[Recovery of Product]

A product, i.e., a cellulose derivative, if it is allowed to precipitate with a poor solvent, can be easily recovered by an ordinary solid-liquid separation treatment. Examples of the poor solvent to be used include water, methanol, ethanol, isopropyl alcohol (IPA), acetone and hexane. Particularly, water, methanol and a water-methanol mixed solution are preferable.

The solid content obtained by the solid-liquid separation can be, if necessary, washed and dried by an ordinary method.

[Resin Composition]

A cellulose derivative according to an example embodiment of the present invention can provide a resin composition, from which a molded body possibly having satisfactory strength (high elastic modulus, high impact strength), thermoplasticity and water resistance can be provided by introducing short-chain, medium-chain and long-chain organic groups in a predetermined ratio.

[Additive]

To a resin composition including a cellulose derivative according to an example embodiment of the present invention, various types of additives usually used in thermoplastic resins can be applied. For example, if a plasticizer is added, thermoplasticity and rupture elongation can be more improved. Examples of such a plasticizer include phthalic acid esters such as dibutyl phthalate, diaryl phthalate, diethyl phthalate, dimethyl phthalate, di-2-methoxyethyl phthalate, ethyl phthalyl-ethyl glycolate and methyl phthalyl-ethyl glycolate; tartaric acid esters such as dibutyl tartrate; adipic acid esters such as dioctyl adipate and diisononyl adipate; polyhydric alcohol esters such as triacetin, diacetyl glycerin, tripropionitrile glycerin and glyceryl monostearate; phosphoric acid esters such as triethyl phosphate, triphenyl phosphate and tricresyl phosphate; dibasic fatty acid esters such as dibutyl adipate, dioctyl adipate, dibutyl azelate, dioctyl azelate and dioctyl sebacate; citric acid esters such as triethyl citrate, acetyltriethyl citrate and tributyl acetycitrate; epoxylated vegetable oils such as epoxylated soybean oil and epoxylated linseed oil; castor oil and a derivative thereof; benzoic acid esters such as ethyl o-benzoylbenzoate; aliphatic dicarboxylic acid esters such as sebacates and azelates; unsaturated dicarboxylic acid esters such as maleates; and N-ethyl toluene sulfonamide, triacetin, o-cresyl p-toluenesulfonate and tripropionin. Particularly of them, if a plasticizer such as dioctyl adipate, benzyl adipate-2-butoxyethoxyethyl, tricresyl phosphate, diphenylcresyl phosphate or diphenyloctyl phosphate is added, not only thermoplasticity and rupture elongation but also impact resistance can be effectively improved.

Examples of other plasticizers include cyclohexane dicarboxylic acid esters such as dihexyl cyclohexanedicarboxylate, dioctyl cyclohexanedicarboxylate and di-2-methyloctyl cyclohexanedicarboxylate; trimellitic acid esters such as dihexyl trimellitate, diethylhexyl trimellitate and dioctyl trimellitate; and pyromellitic acid esters such as dihexyl pyromellitate, diethylhexyl pyromellitate and dioctyl pyromellitate.

To the resin composition of the example embodiment, if necessary, an inorganic or organic granular or fibrous filler can be added. By adding a filler, strength and rigidity can be more improved. Examples of the filler include, mineral particles (talc, mica, calcined diatomaceous earth, kaolin, sericite, bentonite, smectite, clay, silica, quartz powder, glass beads, glass powder, glass flake, milled fiber, Wollastonite, etc.), boron-containing compounds (boron nitride, boron carbide, titanium boride etc.), metal carbonates (magnesium carbonate, heavy calcium carbonate, light calcium carbonate, etc.), metal silicates (calcium silicate, aluminum silicate, magnesium silicate, magnesium aluminosilicate, etc.), metal oxides (magnesium oxide etc.), metal hydroxides (aluminum hydroxide, calcium hydroxide, magnesium hydroxide, etc.), metal sulfates (calcium sulfate, barium sulfate, etc.), metal carbides (silicon carbide, aluminum carbide, titanium carbide, etc.), metal nitrides (aluminum nitride, silicon nitride, titanium nitride, etc.), white carbon and foils of various metals. Examples of the fibrous filler include organic fibers (natural fiber, papers etc.), inorganic fibers (glass fiber, asbestos fiber, carbon fiber, silica fiber, silica-alumina fiber, Wollastonite, zirconia fiber, potassium titanate fiber etc.) and metal fibers. These fillers can be used singly or in combination of two or more kinds.

To the resin composition of the example embodiment, if necessary, a flame retardant can be added. By adding a flame retardant, flame retardancy can be imparted. Examples of the flame retardant include magnesium hydroxide, aluminum hydroxide, metal hydrates such as hydrotalcite, basic magnesium carbonate, calcium carbonate, silica, alumina, talc, clay, zeolite, bromine-based flame retardant, antimony trioxide, phosphoric acid-based flame retardant (aromatic phosphate, aromatic condensed phosphate, etc.), compounds containing phosphorus and nitrogen (phosphazene compound). These flame retardants can be used singly or in combination with two or more kinds.

To the resin composition of the example embodiment, if necessary, a impact resistance improver can be added. By adding a impact resistance improver, impact resistance can be improved. Examples of the impact resistance improver include a rubber component and a silicone compound. Examples of the rubber component include a natural rubber, epoxylated natural rubber and synthesized rubber. Furthermore, examples of the silicone compound include organic polysiloxane formed by polycondensation of alkyl siloxane, alkyl phenyl siloxane, etc. and modified silicone compounds obtained by modifying a side chain or an end of an organic polysiloxane as mentioned above with a polyether, methylstyryl, alkyl, high fatty acid ester, alkoxy, fluorine, an amino group, an epoxy group, a carboxyl group, a carbinol group, a methacryl group, a mercapto group, a phenol group, etc. These impact resistance improvers can be used singly or in combination of two or more kinds.

As the silicone compound, a modified silicone compound (modified polysiloxane compound) is preferred. As the modified silicone compound, a mono-modified polydimethyl siloxane having a structure that includes a main chain constituted of dimethyl siloxane repeat units and that a side chain or a terminal methyl group thereof is partly substituted with an organic substituent containing at least one group selected from an amino group, an epoxy group, a carbinol group, a phenol group, a mercapto group, a carboxyl group, a methacryl group, a long-chain alkyl group, an aralkyl group, a phenyl group, a phenoxy group, an alkyl phenoxy group, a long-chain fatty acid ester group, a long-chain fatty acid amide group and a polyether group, is preferred. The modified silicone compound, because of the presence of such an organic substituent, is improved in affinity for the aforementioned cellulose derivative and dispersibility in the cellulose derivative is improved. Consequently, a resin composition excellent in impact resistance can be obtained.

As such a modified silicone compound, a modified silicone compound produced in accordance with a conventional method can be used.

To the resin composition of the example embodiment, if necessary, additives such as a colorant, an antioxidant and a heat stabilizer may be added as long as they are applied to conventional resin compositions.

To the resin composition of the example embodiment, if necessary, a general thermoplastic resin may be added.

As the thermoplastic resin, a polyester can be added and a straight-chain aliphatic polyester can be preferably used. As the straight-chain aliphatic polyester (Y), the following straight-chain aliphatic polyesters (Y1) and (Y2) are preferable, for example, polybutylene succinate, polybutylene succinate adipate and polycaprolactone can be mentioned.

(Y1) Straight-chain aliphatic polyester containing at least one of repeating units represented by the following formula (VI) and formula (VII)

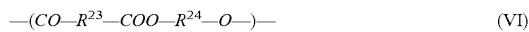

—(CO—$R^{23}$—COO—$R^{24}$—O—)— (VI)

—(CO—$R^{25}$—O—)— (VII)

In the formula (VI), $R^{23}$ represents a divalent aliphatic group having carbon atoms of 1 to 12, preferably 2 to 8 and more preferably 2 to 4; and $R^{24}$ represents a divalent aliphatic group having carbon atoms of 2 to 12, preferably 2 to 8 and more preferably 2 to 4.

In the formula (VII), $R^{25}$ represents a divalent aliphatic group having carbon atoms of 2 to 10, preferably 2 to 8 and more preferably 2 to 4.

(Y2) Straight-chain aliphatic polyester consisting of a product obtained by ring-opening polymerization of a cyclic ester.

The straight-chain aliphatic polyester (Y1) can be obtained by a condensation reaction between at least one selected from the group consisting of, for example, an aliphatic dicarboxylic acid, an acid anhydride thereof and a diester thereof, and an aliphatic diol.

The aliphatic dicarboxylic acid has carbon atoms of, for example, 3 to 12, preferably 3 to 9, more preferably 3 to 5. The aliphatic carboxylic acid is, for example, an alkane dicarboxylic acid. Specific examples thereof include malonic acid, succinic acid, adipic acid, sebacic acid, azelaic acid and dodecane dicarboxylic acid. The aliphatic dicarboxylic acids, for example, can be used alone or in combination of two or more.

The aliphatic diol has carbon atoms of, for example, 2 to 12, preferably 2 to 8 and more preferably 2 to 6. The aliphatic diol is, for example, an alkylene glycol. Specific examples thereof include ethylene glycol, 1,3-propylene glycol, 1,4-butane diol, 1,6-hexane diol, 1,9-nonane diol, 1,10-decane diol and 1,12-dodecane diol. Among them, a straight-chain aliphatic diol having 2 to 6 carbon atoms is preferable, and particularly, ethylene glycol, 1,3-propylene glycol, 1,4-butane diol and 1,6-hexane diol are preferable. The aliphatic diols, for example, can be used alone or in combination of two or more.

The straight-chain aliphatic polyester (Y2) is a straight-chain aliphatic polyester obtained by ring-opening polymerization of a cyclic ester. The cyclic ester is, for example, lactone having carbon atoms of 2 to 12. Specific examples thereof include, α-acetolactone, β-propiolactone, γ-butyrolactone and δ-valerolactone. The cyclic esters, for example, can be used alone or in combination with two or more.

The number average molecular weight of the straight-chain aliphatic polyester (Y) is not particularly limited. It is preferably, for example, 10,000 or more, and more preferably 20,000 or more. It is preferably, for example, 200,000 or less and more preferably 100,000 or less. The aliphatic polyester having a molecular weight within the above range can provide, for example, a more uniform molded body having more excellent dispersibility.

As the number average molecular weight, for example, a value (calibrated by a polystyrene standard sample) obtained by measuring a 0.1% chloroform solution of a sample by GPC can be employed.

By adding a thermoplastic resin having excellent flexibility such as a thermoplastic polyurethane elastomer (TPU) to the resin composition of the example embodiment, impact resistance can be improved. The addition amount of such a thermoplastic resin (particularly, TPU) is, in view of obtaining sufficient addition effect, preferably 1% by mass or more and more preferably 5% by mass or more relative to the total composition containing the cellulose derivative according to the example embodiment.

The thermoplastic polyurethane elastomer (TPU) prepared by using a polyol, a diisocyanate and a chain extender can be suitably used for improving impact resistance.

Examples of the polyol include polyester polyol, polyester ether polyol, polycarbonate polyol and polyether polyol.

Examples of the polyester polyol include a polyester polyol, which is obtained by a dehydration condensation reaction between a polyvalent carboxylic acid such as an aliphatic dicarboxylic acid (succinic acid, adipic acid, sebacic acid, azelaic acid, etc.); an aromatic dicarboxylic acid (phthalic acid, terephthalic acid, isophthalic acid, naphthalene dicarboxylic acid, etc.); an alicyclic dicarboxylic acid (hexahydrophthalic acid, hexahydroterephthalic acid, hexahydroisophthalic acid, etc.) or an acid ester or anhydride thereof, and a polyol such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,3-octane diol, 1,9-nonane diol, or a mixture of these; and a polylactone diol, which is obtained by ring-opening polymerization of a lactone monomer such as ε-caprolactone.

Examples of the polyester ether polyol include a compound obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.) or an acid ester or anhydride thereof, and a glycol such as diethylene glycol or an alkylene oxide adduct (propylene oxide adduct etc.) or a mixture thereof.

Examples of the polycarbonate polyol include a polycarbonate polyol obtained by reacting one or two or more polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol and diethylene glycol with diethylene carbonate, dimethyl carbonate, diethyl carbonate, etc. Further, a copolymer of a polycaprolactone polyol (PCL) and a polyhexamethylene carbonate (PHL) can be used.

Examples of the polyether polyol include a polyethylene glycol, polypropylene glycol and polytetramethylene ether glycol, each of which is obtained by polymerizing respective cyclic ethers: ethylene oxide, propylene oxide and tetrahydrofuran; and copolyethers of these.

Examples of the diisocyanate to be used in formation of TPU include, for example, tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethyl xylene diisocyanate (TMXDI), 1,6,11-undecane triisocyanate, 1,8-diisocyanatemethyl octane, lysine ester triisocyanate, 1,3,6-hexamethylene triisocyanate, bicycloheptane triisocyanate and dicyclohexylmethane diisocyanate (hydrogenated MDI; HMDI). Of these, 4,4'-diphenylmethane diisocyanate (MDI) and 1,6-hexamethylene diisocyanate (HDI) are preferably used.

Examples of the chain extender to be used in formation of TPU, a low-molecular weight polyol can be used. Examples of the low-molecular weight polyol include aliphatic polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol, diethylene glycol and 1,4-cyclohexane dimethanol and glycerin; and aromatic glycols such as 1,4-dimethylolbenzene, bisphenol A and ethylene oxide or a propylene oxide adduct of bisphenol A.

When a silicone compound is copolymerized with a thermoplastic polyurethane elastomer (TPU) obtained from these materials, further excellent impact resistance can be obtained.

These thermoplastic polyurethane elastomers (TPU) can be used singly or in combination.

A method for preparing a resin composition containing a cellulose derivative according to an example embodiment of the present invention, various additives and a thermoplastic resin is not particularly limited. For example, the cellulose derivative, various additives and a thermoplastic resin are melted and mixed by hand-mixing or by use of a known mixer such as a tumbler mixer and a ribbon blender, a single-axial and a multiaxial mixing extruder, a compounding apparatus such as a kneader and a kneading roll, and, if necessary, can be granulated in an appropriate shape. As another suitable preparation method, a method of dispersing a cellulose derivative, various additives and a thermoplastic resin in a solvent such as an organic solvent, mixing them, and, if necessary, further adding a coagulation solvent to obtain a mixed composition of various additives and the resin, followed by evaporating the solvent.

The cellulose derivative according to the example embodiments mentioned above can be used as a base resin for a molding material (resin composition). The molding material using the cellulose derivative as a base resin is suitable for forming a molded body such as housing, e.g., exterior for an electronic device.

The base resin herein refers to a main component of the molding material and to allow including other components as long as they do not prevent the function of the main component. The content rate of the main component is not particularly specified. In the example embodiment, the content of the cellulose derivative in the composition is 50% by mass or more, preferably 70% by mass or more, more preferably 80% by mass or more and particularly preferably 90% by mass or more.

EXAMPLES

Hereinafter, the example embodiments of the present invention will be more specifically described by way of concrete examples.

[Synthesis of Cellulose Derivative]

Synthesis Example 1

In order to enhance reactivity of a cellulose, activation treatment with acetic acid was performed, and thereafter, propionic anhydride and stearic acid were reacted to obtain a cellulose derivative.

First, an activation treatment of a cellulose was performed by the following method. In 90 mL of pure water, 6.0 g (excluding adsorbed moisture) of cellulose (product name: KC Flock, description: W-50GK, manufactured by NIPPON PAPER INDUSTRIES Co., Ltd.) was dispersed. This dispersion was stirred for 24 hours and subjected to suction filtration to remove pure water. The residue on the filter was dispersed in 90 mL of acetic acid, stirred for 24 hours, and then subjected to suction filtration to remove acetic acid. The step of dispersion in acetic acid and removal of acetic acid was repeated twice to obtain activated cellulose.

Next, a cellulose derivative was synthesized by the following method. First, 31.6 g of stearic acid and 28.5 mL of propionic anhydride were placed in a three-neck flask and reacted under nitrogen atmosphere at 100° C. for one hour to synthesize an acid anhydride from stearic acid and propionic acid. Subsequently, to this, 250 mL of 1,4-dioxane was added and the temperature of the reaction solution was down to 50° C. Thereafter, the cellulose activated with acetic acid in the above and a mixed solution of perchloric acid (120 μL) and 1,4-dioxane (50 mL) were added. The mixture was stirred at 50° C. Two hours later, the reaction solution was transferred from the three-neck flask to a beaker, to which 1.5 L of a methanol/water mixed solution (methanol:water=1:1 vol) was added dropwise as a poor solvent to terminate the reaction. The solid precipitated by the dropwise addition was subjected to suction filtration. The residue on the filter was washed with isopropyl alcohol and further with water, and then, dried at 100° C. under reduced pressure to obtain a target cellulose derivative (C1).

The DS values of short-chain (acetyl group), medium-chain (propionyl group) and long-chain (stearyl group) organic groups substituting on cellulose derivative (C1) were obtained by $^1$H-NMR. The DS values with the individual chains were: acetyl group $(DS_{SH})$=1.19, propionyl group $(DS_{ME})$=1.49 and stearyl group $(DS_{LO})$=0.14.

Synthesis Example 2

Activation of a cellulose and synthesis of cellulose derivative (C2) were performed in the same manner as in Example 1 except that an acid anhydride was synthesized from 63.2 g of stearic acid and 28.5 mL of propionic anhydride.

The DS values with respect to short-chain (acetyl group), medium-chain (propionyl group) and long-chain (stearyl group) organic groups substituting on cellulose derivative (C2) were obtained by $^1$H-NMR. The DS values with the individual chains were: acetyl group $(DS_{SH})$=0.95, propionyl group $(DS_{ME})$=1.38 and stearyl group $(DS_{LO})$=0.26.

Synthesis Example 3

Activation of a cellulose was performed in the same manner as in Synthesis Example 1.

Synthesis of a cellulose derivative was performed as follows. First, 63.2 g of stearic acid and 28.5 mL of propionic anhydride were placed in a three-neck flask and reacted under nitrogen atmosphere at 100° C. for one hour to synthesize an acid anhydride from stearic acid and propionic acid. Subsequently, 1,4-dioxane (250 mL) was added thereto and the temperature of the reaction solution was down to 50° C. Thereafter, the cellulose activated with acetic acid in the above and a mixed solution of perchloric acid (120 μL) and 1,4-dioxane (50 mL) were added. The mixture was stirred at 50° C. Two hours later, the reaction solution was transferred from the three-neck flask to a beaker, to which 1.5 L of water was added dropwise to terminate the reaction. The solid precipitated by the dropwise addition was subjected to suction filtration. The residue on the filter was washed with methanol and further with water, and then, dried at 100° C. under reduced pressure to obtain a target cellulose derivative (C3).

The DS values of short-chain (acetyl group), medium-chain (propionyl group) and long-chain (stearyl group) organic groups substituting on cellulose derivative (C3) were obtained by $^1$H-NMR. The DS values with respect to the individual chains were: acetyl group ($DS_{SH}$)=1.28, propionyl group ($DS_{ME}$)=1.43 and stearyl group ($DS_{LO}$)=0.26.

Synthesis Example 4

Activation of a cellulose and synthesis of cellulose derivative (C4) were performed in the same manner as in Example 1 except that an acid anhydride was synthesized from 94.7 g of stearic acid and 28.5 mL of propionic anhydride.

The DS values with respect to short-chain (acetyl group), medium-chain (propionyl group) and long-chain (stearyl group) organic groups substituting on cellulose derivative (C4) were obtained by $^1$H-NMR. The DS values with the individual chains were: acetyl group ($DS_{SH}$)=0.72, propionyl group ($DS_{ME}$)=1.41 and stearyl group ($DS_{LO}$)=0.38.

Synthesis Example 5

Activation of a cellulose and synthesis of cellulose derivative (C5) were performed in the same manner as in Example 1 except that an acid anhydride was synthesized from 189 g of stearic acid and 28.5 mL of propionic anhydride.

The DS values of short-chain (acetyl group), medium-chain (propionyl group) and long-chain (stearyl group) organic groups substituting on cellulose derivative (C5) were obtained by $^1$H-NMR. The DS values with the individual chains were: acetyl group ($DS_{SH}$)=0.91, propionyl group ($DS_{ME}$)=1.04 and stearyl group ($DS_{LO}$)=0.48.

Synthesis Example 6

Activation of a cellulose was performed in the same manner as in Synthesis Example 1.

Synthesis of a cellulose derivative was performed as follows. First, 189 g of stearic acid and 21.1 mL of acetic anhydride were placed in a three-neck flask and reacted under nitrogen atmosphere at 100° C. for one hour to synthesize an acid anhydride from stearic acid and acetic acid. Subsequently, 550 mL of 1,4-dioxane was added thereto and the temperature of the reaction solution was down to 50° C. Thereafter, the cellulose activated with acetic acid in the above and a mixed solution of perchloric acid (240 μL) and 1,4-dioxane (50 mL) were added. The mixture was stirred at 50° C. Two hours later, the reaction solution was transferred from the three-neck flask to a beaker, to which 1.5 L of a methanol/water mixed solution (methanol:water=1:1 vol) was added dropwise as a poor solvent to terminate the reaction. The solid precipitated by the dropwise addition was subjected to suction filtration. The residue on the filter was washed three times with isopropyl alcohol and further once with water, and then, dried at 100° C. under reduced pressure to obtain a target cellulose derivative (C6).

The DS values of short-chain (acetyl group) and long-chain (stearyl group) organic groups substituting on cellulose derivative (C6) were obtained by $^1$H-NMR. The DS values with the individual chains were: acetyl group ($DS_{SH}$)=2.60 and stearyl group ($DS_{LO}$)=0.40.

Synthesis Example 7

In 90 mL of pure water, 6.0 g (excluding adsorbed moisture) of cellulose was dispersed. The dispersion was stirred for 24 hours, and then subjected to suction filtration for 20 minutes to remove pure water. The residue on the filter was dispersed in 90 mL of propionic acid, stirred for 24 hours and subjected to suction filtration for 20 minutes to remove propionic acid. The step of dispersion in propionic acid and removal of propionic acid was repeated twice to obtain activated cellulose.

Subsequently, 63.1 g of stearic acid and 28.5 mL of propionic anhydride were placed in a three-neck flask and reacted in a nitrogen atmosphere at 100° C. for one hour to synthesize an acid anhydride from stearic acid and propionic acid. Subsequently, 250 mL of 1,4-dioxane was added thereto and the temperature of the reaction solution was down to 50° C. Thereafter, the cellulose activated with propionic acid in the above and a mixed solution of perchloric acid (120 μL) and 1,4-dioxane (50 mL) were added. The mixture was stirred at 50° C. Two hours later, the reaction solution was transferred from the three-neck flask to a beaker, to which 1.5 L of a methanol/water mixed solution (methanol:water=1:1 vol) was added dropwise to terminate the reaction. The solid precipitated by the dropwise addition was subjected to suction filtration. The residue on the filter was washed twice with isopropyl alcohol, once with ethanol, and further once with water, and then, dried at 100° C. under reduced pressure to obtain a target cellulose derivative (C7).

The DS values of a medium-chain (propionyl group) and long-chain (stearyl group) organic groups substituting on cellulose derivative (C7) were obtained by $^1$H-NMR. The DS values with the individual chains were: propionyl group ($DS_{ME}$)=2.45 and stearyl group ($DS_{LO}$)=0.43.

[Production and Evaluation of Molded Body]

Molded bodies were produced by using the synthesized cellulose derivatives, as described below and the physical properties of the molded bodies were evaluated.

Example 1

Cellulose derivative (C1) was kneaded at 180° C. and subjected to injection molding performed by a molding-machine at a cylinder temperature of 190° C. and a mold temperature of 110° C. to obtain a molded body. The impact strength, bending strength and water absorption of the molded body were evaluated.

Example 2

Cellulose derivative (C2) was kneaded at 160° C. and subjected to injection molding performed by a molding-machine at a cylinder temperature of 170° C. and a mold temperature of 80° C. to obtain a molded body. The impact strength, bending strength and water absorption of the molded body were evaluated.

Example 3

Cellulose derivative (C3) was kneaded at 160° C. and subjected to injection molding performed by a molding-machine at a cylinder temperature of 170° C. and a mold temperature of 110° C. to obtain a molded body. The impact strength, bending strength and water absorption of the molded body were evaluated.

Example 4

Cellulose derivative (C4) was kneaded at 160° C. and subjected to injection molding performed by a molding-machine at a cylinder temperature of 170° C. and a mold temperature of 80° C. to obtain a molded body. The impact strength, bending strength and water absorption of the molded body were evaluated.

Example 5

Cellulose derivative (C5) was kneaded at 160° C. and subjected to injection molding performed by a molding-machine at a cylinder temperature of 170° C. and a mold temperature of 80° C. to obtain a molded body. The impact strength, bending strength and water absorption of the molded body were evaluated.

Comparative Example 1

As a cellulose derivative, commercially available cellulose acetate propionate (trade name "CAP482-20", manufactured by Eastman Chemical Company, hereinafter referred to as CAP) was used. The cellulose derivative was subjected to injection molding performed by a molding-machine at a cylinder temperature of 220° C. and a mold temperature of 110° C. and the resultant molded body was evaluated.

Comparative Example 2

Cellulose derivative (C6) was kneaded at 210° C. and subjected to injection molding performed by a molding-machine at a cylinder temperature of 210° C. and a mold temperature of 110° C. to obtain a molded body. The impact strength, bending strength and water absorption of the molded body were evaluated.

Comparative Example 3

Cellulose derivative (C7) was kneaded at 160° C. and subjected to injection molding performed by a molding-machine at a cylinder temperature of 170° C. and a mold temperature of 80° C. to obtain a molded body. The impact strength, bending strength and water absorption of the molded body were evaluated.

The method for kneading and molding a cellulose derivative and a method for evaluating physical properties thereof will be described below.

[Kneading Method]

Using a kneader (trade name: HAAKE MiniLab Rheomex CTW5, manufactured by Thermo Electron Corporation), 7.5 g of cellulose derivative was kneaded. At this time, the rotation number of a screw was set at 60 rpm. The raw materials were supplied from a supply port of the kneader and kneaded for 3 minutes.

[Molding Method]

Using an injection molding machine (trade name: HAAKE MiniJet II, manufactured by Thermo Electron Corporation), molded bodies having a thickness of 2.5 mm, a width of 13 mm and a length of 80 mm were produced by using the cellulose derivatives mentioned above.

[Impact Strength]

Notched Izod impact strength of the molded bodies obtained was measured in accordance with JIS K7110.

[Bending Property]

The bending test (measurements of maximum bending stress, rupture elongation, and bending elastic modulus) of the molded bodies obtained was performed in accordance with JIS K7171.

[Water Resistance]

The water absorption of the molded bodies obtained was measured in accordance with JIS K7209.

The number average molecular weights (Mn), weight average molecular weights (Mw), molecular weight distributions (Mw/Mn) of the cellulose derivatives obtained are shown in Table 1 and evaluation results are shown in Table 2.

TABLE 1

| Cellulose derivative | Organic substituent | | | Substitution degree | | | | Mn | Mw | Mw/Mn |
|---|---|---|---|---|---|---|---|---|---|---|
| | Short-chain | Midium-chain | Long-chain | $DS_{SH}$ | $DS_{ME}$ | $DS_{LO}$ | Total | | | |
| C1 | Acetyl | Propionyl | Stearyl | 1.19 | 1.49 | 0.14 | 2.82 | 71,000 | 112,000 | 1.6 |
| C2 | Acetyl | Propionyl | Stearyl | 0.95 | 1.38 | 0.26 | 2.59 | 64,000 | 97,000 | 1.5 |
| C3 | Acetyl | Propionyl | Stearyl | 1.28 | 1.43 | 0.26 | 2.97 | 69,000 | 104,000 | 1.5 |
| C4 | Acetyl | Propionyl | Stearyl | 0.72 | 1.41 | 0.38 | 2.51 | 63,000 | 93,000 | 1.5 |
| C5 | Acetyl | Propionyl | Stearyl | 0.91 | 1.04 | 0.48 | 2.43 | 79,000 | 138,000 | 1.8 |
| CAP | Acetyl | Propionyl | None | 0.11 | 2.64 | 0 | 2.75 | 34,000 | 99,000 | 2.9 |
| C6 | Acetyl | None | Stearyl | 2.6 | 0 | 0.40 | 3.00 | 28,000 | 47,000 | 1.7 |
| C7 | None | Propionyl | Stearyl | 0 | 2.45 | 0.43 | 2.88 | 70,000 | 182,000 | 2.6 |

TABLE 2

| | Cellulose derivative | Impact strength Izod KJ/m² | Bending properties | | | Water resistance | Thermoplasticity Molding Temp. ° C. |
|---|---|---|---|---|---|---|---|
| | | | Maximum bending stress MPa | Rupture elongation % | Bending elastic modulus GPa | Water absorption % | |
| Example 1 | C1 | 2.4 | 83.1 | >10 | 2.0 | 1.5 | 190 |
| Example 2 | C2 | 4.7 | 69.0 | >10 | 1.9 | 1.2 | 170 |
| Example 3 | C3 | 5.8 | 72.8 | >10 | 1.9 | 1.3 | 170 |

TABLE 2-continued

|  | Cellulose derivative | Impact strength Izod KJ/m² | Bending properties | | | Water resistance | |
|---|---|---|---|---|---|---|---|
|  |  |  | Maximum bending stress MPa | Rupture elongation % | Bending elastic modulus GPa | Water absorption % | Thermoplasticity Molding Temp. ° C. |
| Example 4 | C4 | 2.8 | 46.4 | >10 | 1.3 | 0.83 | 170 |
| Example 5 | C5 | 2.4 | 53.9 | >10 | 2.0 | 0.82 | 170 |
| Comparative Example 1 | CAP | 8.1 | 106.0 | >10 | 2.0 | 2.8 | 220 |
| Comparative Example 2 | C6 | Unable to measure | 13.0 | 0.7 | 2.0 | 0.83 | 210 |
| Comparative Example 3 | C7 | 7.0 | 36.4 | >10 | 1.1 | 0.84 | 170 |

As shown in Table 1 and Table 2, cellulose derivatives (Example 1 to Example 5) prepared by introducing three components of short-chain, medium-chain and long-chain organic groups within the predetermined DS ranges, exhibited high impact strength and high bending properties (maximum bending stress and bending elastic modulus), and low water absorption (excellent water resistance). In addition, since the molding temperatures were all 200° C. or less, satisfactory thermoplasticity was shown.

In contrast, the cellulose resin of Comparative Example 1 was prepared by introducing a short-chain organic group and a medium-chain organic group but no long-chain organic group. Due to the presence of the short-chain organic group and medium-chain organic group, impact strength and bending property are satisfactory; however, due to absence of the long-chain organic group, molding temperature was as high as 220° C. and thermoplasticity and water resistance were low. The cellulose resin of Comparative Example 2 was prepared by introducing a short-chain organic group and a long-chain organic group but no medium-chain organic group. Due to the presence of the long-chain organic group, water resistance was improved; however, the molding temperature was as high as 210° C. and the thermoplasticity was low. In addition, the molded body obtained was extremely fragile. Due to fragility, impact strength was unable to measure and bending property was poor. This was because, due to absence of the medium-chain organic group, affinity between the short-chain organic group and the long-chain organic group decreased and the long-chain organic group was unevenly introduced in the cellulose, with the result that the plasticization effect of the long-chain organic group was not sufficiently exerted; and the localization of the long-chain organic group conceivably affected impact strength and bending strength. The cellulose derivative of Comparative Example 3 was prepared by introducing a medium-chain organic group and a long-chain organic group but no short-chain organic group. Due to the presence of the medium-chain organic group and the long-chain organic group, flexibility of cellulose was enhanced and impact strength and thermoplasticity as well as water resistance were improved. However, due to the absence of the short-chain organic group, interaction between cellulose molecular chains became weakened, with the result that maximum bending stress and bending elastic modulus decreased.

Example 6

To 90 parts of cellulose derivative (C2), 10 parts of polybutylene succinate adipate (PBSA; trade name: Bionolle 3001, manufactured by SHOWA DENKO K.K.) was added. The mixture was kneaded at 160° C. and subjected to injection molding performed by a molding-machine at a cylinder temperature of 170° C., and a mold temperature of 80° C. to obtain a transparent molded body. The impact strength, bending properties and water absorption of the molded body were evaluated. The results are shown in Table 3.

TABLE 3

|  | Resin composition | Impact strength Izod KJ/m² | Bending properties | | | Water resistance | |
|---|---|---|---|---|---|---|---|
|  |  |  | Maximum bending stress MPa | Rupture elongation % | Bending elastic modulus GPa | Water absorption % | Thermoplasticity Molding Temp. ° C. |
| Example 6 | C2(90)/PBSA(10) | 11.0 | 60.3 | >10 | 1.7 | 1.2 | 170 |
| Example 2 | C2(100) | 4.7 | 69.0 | >10 | 1.9 | 1.2 | 170 |

As shown in Example 6, a resin composition further improved in impact strength was obtained while maintaining high bending stress, bending elastic modulus, water resistance and thermoplasticity by adding an additive, i.e., PBSA, to cellulose derivative (C2) (compared to Example 2).

As mentioned above, a cellulose derivative having excellent thermoplasticity, water resistance and strength (elastic modulus, impact strength) can be provided by adding three components, i.e., short-chain, medium-chain and long-chain components, at predetermined substitution degrees.

While the invention has been particularly shown and described with reference to the example embodiments thereof and Examples, the invention is not limited to the aforementioned example embodiments and Examples. It will be understood by those of ordinary skill in the at that various changes in form and details may be made therein without departing from the spirit and scope of the present invention as defined by the claims.

The invention claimed is:

1. A cellulose derivative in which at least a part of hydrogen atoms of hydroxyl groups of a cellulose is substituted with a short-chain organic group (acetyl group) having 2 carbon atoms, a medium-chain organic group having 3 to 5 carbon atoms and a long-chain organic group having 12 to 30 carbon atoms at the following substitution degrees:

$0.7 \leq DS_{SH} \leq 1.5$
$0.5 \leq DS_{ME} \leq 2.0$
$0.1 \leq DS_{LO} < 0.5$
$2.4 \leq DS_{SH} + DS_{ME} + DS_{LO} \leq 3$ where $DS_{SH}$ represents the substitution degree with the short-chain organic group; $DS_{ME}$ represents the substitution degree with the medium-chain organic group; and $DS_{LO}$ represents the substitution degree with the long-chain organic group.

2. The cellulose derivative according to claim 1, wherein the medium-chain organic group is an acyl group having 3 or 4 carbon atoms.

3. A resin composition comprising the cellulose derivative according to claim 2.

4. The resin composition according to claim 3, comprising 50% by mass or more of the cellulose derivative.

5. A molded body molded from the resin composition according to claim 3.

6. The cellulose derivative according to claim 1, wherein the medium-chain organic group is a propionyl group and the long-chain organic group is a stearyl group.

7. A resin composition comprising the cellulose derivative according to claim 6.

8. The resin composition according to claim 7, comprising 50% by mass or more of the cellulose derivative.

9. A molded body molded from the resin composition according to claim 7.

10. A resin composition comprising the cellulose derivative according to claim 1.

11. The resin composition according to claim 10, comprising 50% by mass or more of the cellulose derivative.

12. A molded body molded from the resin composition according to claim 5.

13. A method for producing the cellulose derivative according to claim 1, comprising
  an activation treatment step of bringing an activation solvent having affinity for a cellulose into contact with the cellulose to swell the cellulose, and
  a reaction step of reacting the activated cellulose with reactants for introducing the short-chain organic group, medium-chain organic group and long-chain organic group.

14. The method for producing the cellulose derivative, according to claim 13, wherein the reactants for introducing the short-chain organic group, medium-chain organic group and long-chain organic group are carboxylic acids or carboxylic anhydrides.

15. The method for producing the cellulose derivative according to claim 14, wherein the activation treatment comprises a step of soaking the cellulose in water and then removing water and a step of soaking the cellulose in acetic acid and then removing acetic acid; and the activated cellulose is reacted with a mixed anhydride of stearic acid and propionic acid obtained by reaction between stearic acid and propionic acid while controlling a mixing ratio thereof.

* * * * *